(12) United States Patent
Fouren et al.

(10) Patent No.: US 9,225,551 B2
(45) Date of Patent: Dec. 29, 2015

(54) COMMUNICATIONS DEVICE

(75) Inventors: Nils Hakan Fouren, Barcelona (ES);
Juan Carlos Riveiro Insua, Valcencia (ES); Jose Abad Molina, Rincón de la Victoria (ES); David Ruiz Lopez, Barcelona (ES)

(73) Assignee: BROADCOM CORPORATION, Irvine, CA (US)

( * ) Notice: Subject to any disclaimer, the term of this patent is extended or adjusted under 35 U.S.C. 154(b) by 418 days.

(21) Appl. No.: 13/114,940

(22) Filed: May 24, 2011

(65) Prior Publication Data

US 2011/0286393 A1    Nov. 24, 2011

(30) Foreign Application Priority Data

May 24, 2010 (GB) .................................. 1008633.8

(51) Int. Cl.
*H04W 4/00* (2009.01)
*H04L 12/54* (2013.01)
(Continued)

(52) U.S. Cl.
CPC ........ *H04L 12/5692* (2013.01); *H04L 12/2807* (2013.01); *H04L 12/2836* (2013.01); *H04L 29/12584* (2013.01); *H04L 29/12839* (2013.01); *H04L 43/00* (2013.01); *H04L 47/10* (2013.01); *H04L 47/14* (2013.01); *H04L 47/36* (2013.01); *H04L 61/2596* (2013.01);
(Continued)

(58) Field of Classification Search
CPC ............ H04L 12/2807; H04L 12/2836; H04L 12/5692; H04L 69/18; H04L 29/12839; H04L 61/2596; H04L 61/6022; H04L 29/12584

USPC .................................. 370/328–332, 351, 352
See application file for complete search history.

(56) References Cited

U.S. PATENT DOCUMENTS 7,486,965 B1 * 2/2009 Hollister .................... 455/553.1
2004/0198430 A1 * 10/2004 Moriyama et al. ......... 455/556.1
(Continued)

FOREIGN PATENT DOCUMENTS

EP    2026534 A1    2/2009
GB    2455074 A    6/2009
(Continued)

OTHER PUBLICATIONS

European Search Report: EP11004270.2 dated Sep. 9, 2011, 3 pages.
(Continued)

*Primary Examiner* — Jae Y Lee
*Assistant Examiner* — Jean F Voltaire
(74) *Attorney, Agent, or Firm* — Garlick & Markison; Randy W. Lacasse

(57) ABSTRACT

A communications device includes a first circuit and a second circuit. The first circuit includes a wired medium interface circuit that is configured to, in use, communicate data over a wired medium. The second circuit includes a wireless medium interface circuit that is configured to, in use, communicate data over a wireless medium. A destination address controller is included in the first circuit and is operative to determine to which of a plurality of destination addresses at a communications device data is to be communicated from the second circuit. The communications device can have individual visibility of a plurality of destination addresses (e.g. for respective devices) when data is received or transmitted by the wireless medium interface circuit (second circuit).

20 Claims, 5 Drawing Sheets

(51) Int. Cl.
*H04L 12/801* (2013.01)
*H04L 12/805* (2013.01)
*H04L 12/26* (2006.01)
*H04L 12/28* (2006.01)
*H04L 29/12* (2006.01)
*H04L 29/06* (2006.01)
*H04W 28/14* (2009.01)
*H04W 84/18* (2009.01)
*H04W 40/00* (2009.01)

(52) U.S. Cl.
CPC ........... *H04L 61/6022* (2013.01); *H04L 69/18* (2013.01); *H04W 28/14* (2013.01); *H04W 40/00* (2013.01); *H04W 84/18* (2013.01)

(56) References Cited

U.S. PATENT DOCUMENTS

| | | | |
|---|---|---|---|
| 2004/0208151 A1* | 10/2004 | Haverinen et al. | 370/338 |
| 2004/0266424 A1* | 12/2004 | Park et al. | 455/426.1 |
| 2004/0266427 A1* | 12/2004 | Kurokawa | 455/426.2 |
| 2005/0063355 A1* | 3/2005 | Iwamura | 370/351 |
| 2007/0097919 A1 | 5/2007 | Tsubota | |
| 2007/0127399 A1* | 6/2007 | Ookuma et al. | 370/254 |
| 2008/0137660 A1* | 6/2008 | Olakangil et al. | 370/392 |
| 2008/0259888 A1* | 10/2008 | Terashima | 370/338 |
| 2009/0110088 A1 | 4/2009 | Di Giandomenico | |
| 2009/0161640 A1 | 6/2009 | Shin et al. | |
| 2011/0032937 A1 | 2/2011 | Gould | |

FOREIGN PATENT DOCUMENTS

| | | |
|---|---|---|
| WO | 2006119573 A1 | 11/2006 |
| WO | 2010100877 A1 | 9/2010 |

OTHER PUBLICATIONS

Search Report; Application No. GB1008633.8; Oct. 7, 2010; 2 pages.
European Office Action dated Sep. 3, 2013 EP11004270.2, 6 pages.

* cited by examiner ns Device

CROSS-REFERENCE TO PRIORITY APPLICATION

This application claims priority under 35 U.S.C. §119(a) to Great Britain Application Serial No. GB1008633.8 filed May 24, 2010, which is incorporated herein by reference in its entirety for all purposes.

FIELD OF THE INVENTION

The present invention relates to communications devices and a communications network including such communications devices, in particular, but not exclusively, for application with multi-media devices.

BACKGROUND OF THE INVENTION

It is known to provide for data communication between and amongst multi-media devices, which are installed, for example, in a residential or commercial building, by means of a communications network. The multi-media devices might, for example, include Network Attached Storage (NAS), a Home Gateway (HGW), a Personal Computer (PC), a television (TV), and a Set-Top Box (STB). Communication between and amongst such multi-media devices is by means of a wired medium interface circuit at each multi-media device (or node) with the wired medium interface circuits being operative to communicate data from node to node over an appropriate wired medium. The medium interface circuit may be operative to transmit and receive data over one or more of power lines, telephone lines and coaxial cables.

WiFi communications is finding widespread use in residential and commercial environments. Providing for communication between and amongst nodes in a communications network over a wired medium and by WiFi can be beneficial in respect of providing for improved coverage, ubiquity and reliability. Furthermore, channel conditions between two nodes can vary, for example in terms of attenuation, noise and group delay. Hence, it may be difficult to guarantee a high level of channel capacity on a particular medium. Using wired and WiFi communication in a network can minimize the effects of channel variation.

An approach to providing a network having wired and WiFi communication is combining a wired medium interface circuit with a WiFi transceiver at each network node. However, WiFi specifications impose a limit on the number of MAC addresses that a WiFi transceiver can support. More specifically and at present, a WiFi transceiver supports one MAC address. The present inventors have appreciated that if two or more devices are connected to a network node, for example at its Ethernet interface, the connected devices are not independently visible to the rest of the network when communication is by WiFi. For example, if a node in a network is connected by an Ethernet switch to a Personal Computer (PC) and a printer and data is received over the network by a WiFi transceiver at the node, the single MAC address means that the node is unable to determine whether the data is intended for the PC or the printer.

BRIEF DESCRIPTION OF DRAWINGS

Further features and advantages of the present invention will become apparent from the following specific description, which is given by way of example only and with reference to the accompanying drawings, in which.

DETAILED DESCRIPTION

Figure 1:
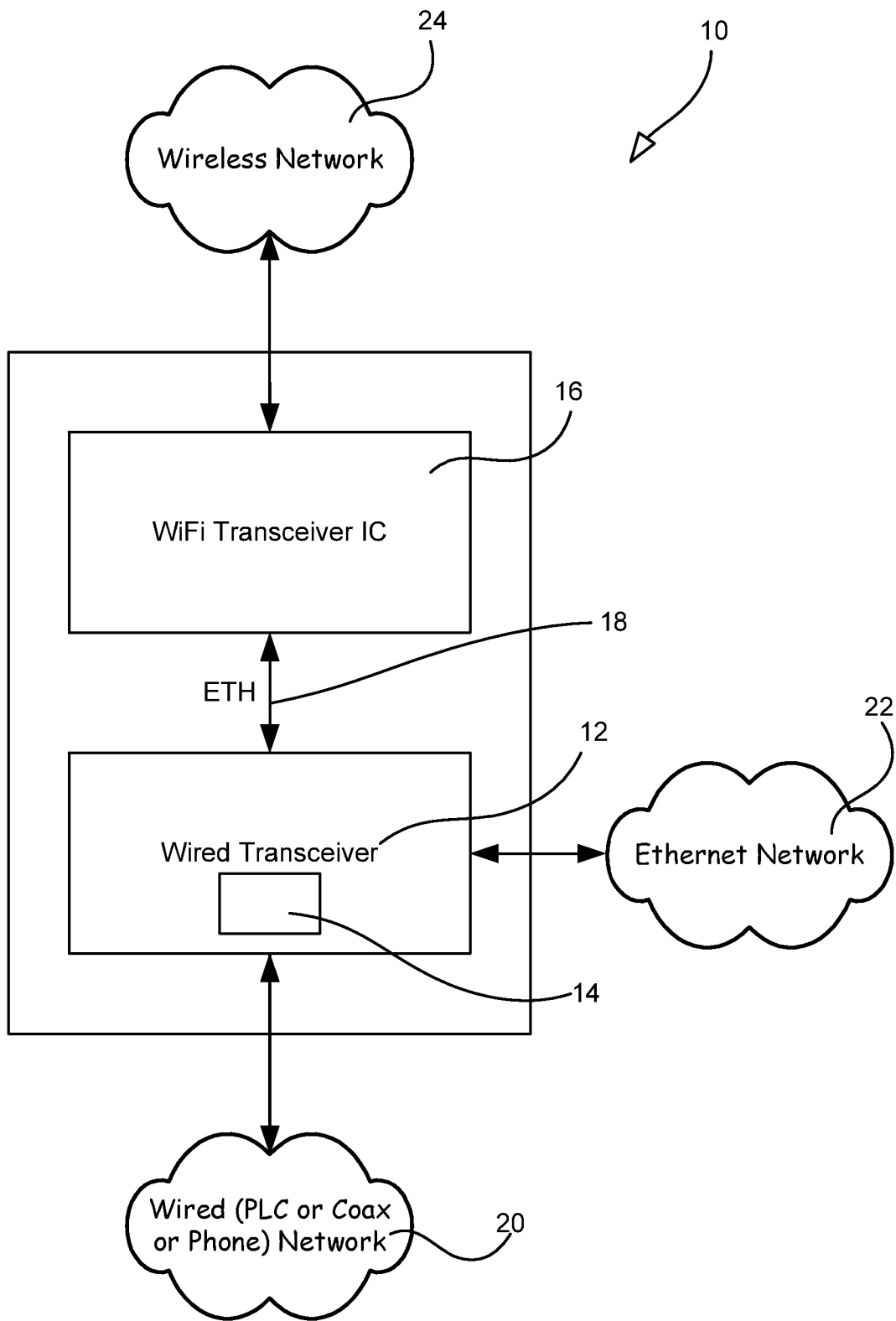
FIG. 1 is a representation of a first embodiment of the present invention.

According to a first aspect of the present invention a communications device includes a first circuit and a second circuit. The first circuit includes a wired medium interface circuit that is configured to, in use, communicate data over a wired medium. The second circuit includes a wireless medium interface circuit that is configured to, in use, communicate data over a wireless medium. A destination address controller is included in the first circuit and is operative to determine to which of a plurality of destination addresses at a communications device data is to be communicated from the second circuit.

The communications device can have individual visibility of a plurality of destination addresses (e.g. for respective devices) when data is received or transmitted by the wireless medium interface circuit (second circuit). Hence, the communications device may overcome a limitation in MAC addresses supported by a wireless medium interface circuit, such as the sole MAC address supported by a WiFi transceiver. For example, it may be that the data is to be communicated to one of a plurality of addresses, such as a first address for a PC and a second address for a printer, at another communications devices, with each of the plurality of addresses corresponding to a different device connected to the other communications device. Hence, the destination address controller provides for independent visibility of more than one device connected to the other communications devices.

Also, the communications device may be configured for communication over wired and wireless media when in use in a network. In contrast, certain known communications devices force a network to use one or other of the wired and wireless media such that the network is either wired or wireless but not both. Hence, the destination address controller may be operative to determine to which of a plurality of destination addresses at a communications devices further data is to be communicated by the first circuit.

A Wireless Distribution System (WDS) can provide for routing of data to two or more devices connected to a WiFi enabled node in a WiFi communications network. However, WDS is configured for WiFi communication only and thus does not provide for communication in a network having both wireless and wired communication of data. Indeed, WDS is designed to be used in applications lacking wired links. Alternatively or in addition, the communications device may be operative such that at least one of the wired medium interface circuit and the wireless medium interface circuit transmits the data over its respective medium, e.g. to another communications device having a plurality of destination addresses.

Alternatively or in addition, the communications device may be operative when in use such that the second circuit communicates data (e.g. bridges data received from the wireless medium) to one of a plurality of devices connected to the same communications devices. Hence, the plurality of addresses may correspond to devices attached to the same communications devices. For example, the plurality of devices may be connected by an Ethernet connection to the communications device. Hence, the wireless medium interface circuit of the communications device may receive the data from another communications device and the communications device may bridge the received data to one of the plurality of devices in dependence on the destination address controller determining to which of the devices the data is to be communicated. The communications device and the plurality of devices may be configured to be included in a node of a communications network.

The destination address controller is included in the first circuit because the first circuit may be the only one of the first and second circuits that has individual visibility of a plurality of destination addresses. Therefore, the communications device may be operative to convey data received by the wireless medium interface circuit to the first circuit, in which the destination address controller is operative to determine the destination address for the data.

Alternatively or in addition and where the second circuit is capable of determining a destination address, the communications device may be configured such that operation of the destination address controller overrides an address determination made by the second circuit. Hence, all bridging decisions may be made by the first circuit. Certain known communications devices include a discrete wireless medium interface circuit, a discrete wired medium interface circuit and a routing engine. The discrete wireless and wired interface circuits are connected by an Ethernet interface and the routing engine is operative to direct data packets to one interface circuit or the other with each interface circuit making its own bridging decision. Thus, according to such known communications devices and in contrast with the present invention there is no destination address controller at the wired medium interface circuit that is operative to make bridging decisions for the wireless medium interface circuit.

Alternatively or in addition, the communications device may further include a communications link between the first and second circuits, the communications link operating according to a frame based standard, such as Ethernet according to the 802.3 standard. The Ethernet standard may be transmitted across one of several inter system connections, such as one of the following: MII, RMII, RvMII, GMII, RGMII, SMII, 10/100, 10/100/1000, USB1.1, USB2, USB3, SDIO, PCIe and PCI. Hence, the communications link may be operative to convey data received by the wired medium interface to the second circuit and to convey data received by the wireless medium interface circuit to the first circuit.

Alternatively or in addition, the destination address controller may be constituted in software, such as firmware operating on the first circuit. Hence, there may be no need to develop the hardware of the first circuit to implement the destination address controller. More specifically, the destination address controller may be operative to implement a communications protocol that is operative to identify each of the plurality of destination addresses. For example, the protocol may be operative to assign a unique address identifier to each of the plurality of destination addresses where the destination addresses are connected to another communications device. Alternatively, the protocol may be operative to recognize a unique address identifier corresponding to one of the plurality of destination addresses where the destination addresses identify a plurality of devices attached to the communications device.

Alternatively or in addition, the destination address controller may be operative to implement a communications protocol that is operative at the data link layer (i.e. Layer 2 of the OSI model). Thus, the communications protocol may be operative to include destination address identification information in a data packet transmitted by the communications device. Alternatively, the communications protocol may be operative to recognize destination address identification information in a data packet received by the communications device. Hence, the destination address controller may be operative to implement a virtual LAN (VLAN) with each destination address having a unique VLAN identifier. More specifically, the communications protocol may be in accordance with the IEEE 802.1Q standard.

Alternatively or in addition, the communications device may further include a communications controller that is operative to provide for selective communication of data over each of the wired medium and the wireless medium. Selective communication of data may be in dependence on at least one of: network traffic load; quality of service requirements (such as latency, jitter and guaranteed bandwidth); available channel capacity; and number of hops. Data may be communicated simultaneously over the wired medium and the wireless medium. Such simultaneously communicated data may be different data sent to or received from the same or different destinations. Also, such simultaneously communicated data may be the same data sent to or received from the same or different destinations. The wired medium interface circuit and the wireless medium interface circuit may operate asynchronously of each other. Hence, performance may be improved by splitting data between the two media. Also, performance may be improved by using the two media at the same time.

More specifically, the communications device may further include a wired medium access controller, which is operative to control the wired medium interface circuit, and a wireless medium access controller, which is operative to control the wireless medium interface circuit. Therefore the communications controller may be a system medium access controller that is operative to control each of the wired and wireless medium access controllers. In a form, the second circuit may further include a Wide Area Network (WAN) interface circuit that is configured to, in use, communicate data over a WAN. More specifically, the communications device may further include a communications link between the first circuit and the WAN interface circuit of the second circuit. The communications link may operate according to a frame based standard, such as Ethernet according to the 802.3 standard. The communications device may further include a communications link between the WAN interface circuit and the wireless medium interface circuit. Hence, the destination address controller at the first circuit may control whether data is transmitted over the WAN or over the wireless network. Thus, the WAN interface circuit and the wireless medium interface circuit may constitute the destination addresses at the communications device, whereby bridging decisions are taken at the first circuit. For example and where the destination address controller is operative to implement a VLAN, each interface of the second circuit other than an interface between the first and second circuits may have a unique VLAN identifier. Also, each of the interfaces for the plural wired media at the first circuit may be assigned a unique VLAN identifier. This is because a single MAC address is used for all the wired media interfaces at the first circuit.

Alternatively or in addition, the second circuit may include a plurality of further interfaces, e.g. wireless, WAN or Ethernet, other than an interface, e.g. Ethernet, between the first and second circuits and each of the plurality of further interfaces may correspond to a different one of a plurality of destination addresses.

Alternatively or in addition and where the WAN interface circuit is capable of determining a destination address, the communications device may be configured such that operation of the destination address controller overrides an address determination made by the WAN interface circuit.

Alternatively or in addition, the first circuit may form part of a first discrete device, such as a first System on a Chip (SoC). Hence, the destination address controller may be included in the first SoC. Alternatively or in addition, second first circuit may form part of a second discrete device, such as a second System on a Chip (SoC). The first and second circuits may be separate from each other with communication between the first and second circuits being by means of an interface, such as a serial interface. Where the second circuit includes a WAN interface circuit, the wireless medium interface circuit may form part of a second discrete device, such as a second System on a Chip (SoC), and the WAN interface circuit may form part of a third discrete interface circuit, such as a third System on a Chip (SoC).

Alternatively or in addition, a medium interface circuit may be configured to operate as a transceiver. Hence, the medium interface circuit may be operable to receive and transmit data.

Alternatively or in addition, the wireless medium interface circuit may be configured for at least one of: communication in accordance with one of the IEEE 802.11 standards (i.e. WiFi); Ultra-wideband (UWB) communication; and 60 GHz communication.

Alternatively or in addition, the wired medium interface circuit may be configured for communication over at least one of: powerline; twisted pair; and coaxial cable.

Alternatively or in addition, a destination address may correspond to at least one of: a device, such as a multi-media device, connected to one of the communications device itself or another communications device; and an interface circuit, such as a wireless interface circuit or a WAN interface circuit, forming part of the communications device itself or another communications device.

Alternatively or in addition, the communications device may include a correspondence database, the correspondence database relating each destination address to a different one of a device (e.g. in the form of a MAC address) and an interface circuit.

Alternatively or in addition and where the second circuit includes an external interface other than the wireless medium interface and a communications link between the first and second circuits, the communications device may be operative: to convey data received at the external interface to the first circuit, the data having an external destination address; and to assign a temporary destination address, such as a VLAN identifier, to the conveyed data if the external destination address is the same as one of the plurality of destination addresses operated upon by the destination address controller. More specifically, the communications device may be operative to replace the temporary destination address with the external destination address when the data is transmitted from the communications device, e.g. when the data leaves a communications network including the communications device.

Alternatively or in addition, the communications device may be configured to form part of a network including at least one further communications devices.

Hence and according to a second aspect of the present invention, there is provided a communications network including plural communications devices, each communications devices being in accordance with the first aspect of the present invention.

Alternatively or in addition, a first communications devices may include a correspondence database, the correspondence database relating each destination address, such as a VLAN identifier, to a different one of a device (e.g. in the form of a MAC address) and an interface circuit. The correspondence database may be operative with the destination address controller to determine the destination address to which data is to be communicated. More specifically, the first communications device and a second communications device may be operative to convey the correspondence database from the first communications devices to the second communications devices over the wired medium. Hence, destination address information may be propagated throughout the communications network.

Alternatively or in addition, the communications network may include at least one device connected to at least one node of the communications network. A device may be multimedia device or IT infrastructure device, such as a router, an access point, a network interface card (NIC) or an Ethernet adapter.

Referring now to FIG. 1, a first embodiment 10 of a communications device according to the present invention is shown. The communications device 10 includes a first circuit, which includes a wired medium interface circuit 12 and a destination address controller 14, and a second circuit, which includes a wireless medium interface circuit 16. The form and function of the destination address controller 14 will be described below with reference to FIG. 2. In addition, the communications device 10 includes an interface 18 (which constitutes a communications link) between the first and second circuits. The interface 18 is operative according to the Ethernet 802.3 standard. The wired medium interface circuit 12 includes a core that is based on a home networking integrated circuit (a System on a Chip (SoC), such as the GGL541, from Gigle Networks Ltd of Capital House, 2 Festival Square, Edinburgh, EH3 9SU, UK), which is operative to receive and transmit data over wired media 20 including powerline, coaxial cable and twisted pair (such as is used for telephone lines).

The wired medium interface circuit 12 also includes at least one external Ethernet interface for connection to an Ethernet network 22 and/or local devices, such as the local devices described below with reference to FIG. 2. The wireless medium interface circuit 16 is a known WiFi transceiver device in the form of a SoC operable according to at least one of the 802.11 standards, such as 802.11a, 802.11b, 802.11g, 802.11n, etc., and thus forms part of a WiFi network 24. Wi-Fi is a certification mark devised by the Wi-Fi Alliance to indicate that a wireless local area network (WLAN) product is based on the Institute of Electrical and Electronics Engineers' (IEEE) 802.11 standards (see http://www.wi-fi.org/knowledge_center_overview.php?type=3#W). Reference should be made to publicly available product data from the vendor of the GGL541 and from a vendor of a wireless communications circuit, such as Intel, Broadcom, Marvell, Ralink, Atheros and CSR; such product data provides sufficient information for the skilled person to implement the communications device 10 shown in FIG. 1 with the exception of the destination address controller 14 and the simultaneous communications by the wired and wireless medium interface circuits without resorting to any more than ordinary design skill. The communications device 10 of FIG. 1 is operable to receive and transmit data to and from the wired medium interface circuit 12 and the wireless medium interface circuit 16 on a simultaneous basis, whereby a combined wireless and wired communications network may be formed from at least two such communications devices 10 as is described below with reference to FIG. 2. Provision for simultaneous communications by the wired medium interface circuit 12 and the wireless medium interface circuit 16 is described below with reference to FIG. 5.

Figure 2:
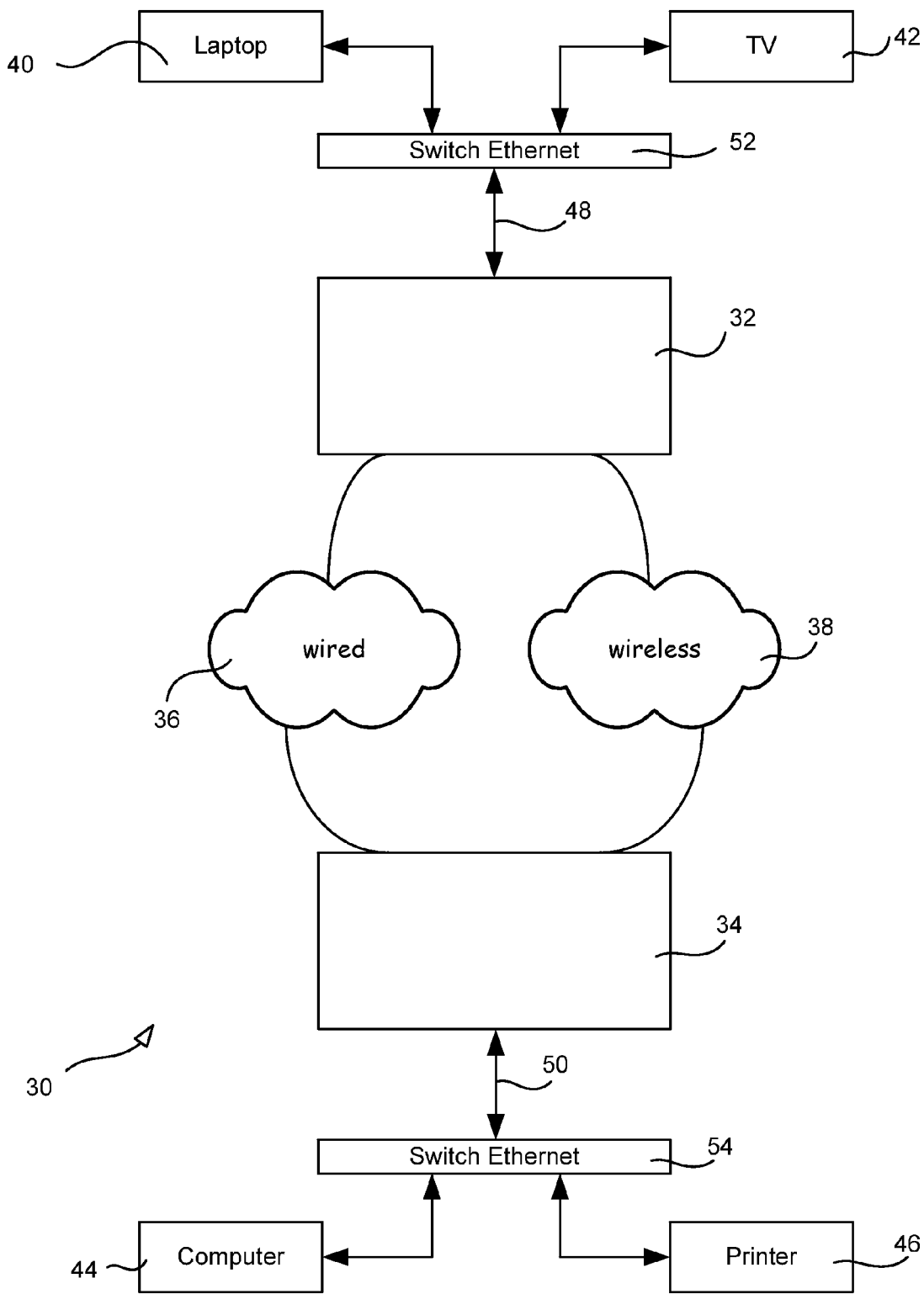
FIG. 2 is a representation of the first embodiment when used in a communications network.

FIG. 2 shows a communications network 30 having first 32 and second 34 nodes (which each constitute the communications device of FIG. 1). The communications network 30 includes further un-illustrated nodes that are connected to each other and to the nodes shown in FIG. 2 in the same fashion that the first and second nodes are connected to each other. The first and second nodes 32, 34 are connected to each other by already installed wired media 36 and by a WiFi link 38. More specifically, the already installed wired media consist of: a powerline cable; a coaxial cable; and a twisted pair telephone line. The network 30 of FIG. 2 is used to provide for communication between and amongst a plurality of rooms in the building. Thus, for example, each of the nodes may be located in a different room of a residential building. Each of the first and second nodes 32, 34 is electrically connected to two devices. Thus, the first node 32 is connected to a laptop computer 40 and a television 42 and the second node 34 is connected to a Personal Computer (PC) 44 and a printer 46. Other un-illustrated nodes in a larger communications network than that represented in FIG. 2 might, for example, be connected to a Home Gateway (HGW), audio-visual entertainment device, etc. The external Ethernet interface of each of the first and second nodes 32, 34 provides for a respective Ethernet connection 48, 50 to a respective two way Ethernet switch 52, 54. A first Ethernet switch 52 at the first node 32 is connected to the laptop computer 40 and the television 42 and a second Ethernet switch 54 at the second node 34 is connected to the PC 44 and the printer 46.

As explained above, the WiFi wireless medium interface circuits 16 at each node are capable of supporting only one MAC address. Hence, data for the printer 46 that is received wirelessly at the second node 34 from the first node 32 cannot be bridged to the printer according to known approaches (i.e. where the second node 34 supports WiFi communications only) because the wireless medium interface circuit 16 at the second node 34 cannot distinguish between the PC 44 and the printer 46. According to the present invention, the destination address controllers 14 at each node are operative to implement a VLAN communications protocol in accordance with the IEEE 802.1Q standard.

More specifically, each destination address controller 14 is operative to modify data packets, which are to be transmitted, in accordance with the IEEE 802.1Q standard. Thus, a unique VLAN identifier is used for each device, e.g. the PC 44 and the printer 46, such that a transmitted packet contains a VLAN device identifier for a particular device. VLAN identifiers can also be assigned to interfaces of communications devices as well as devices connected to communications devices. The assignment of VLAN identifiers to interfaces will be described below with reference to FIG. 4. Hence, each destination address controller 14 is operative to recognize a VLAN identifier in a data packet received at a node and to bridge the data to the identified device in dependence on the recognized VLAN identifier.

As shown in FIG. 1, the destination address controller 14 is included in the first, wired communications circuit. Hence, data that is to be transmitted over the WiFi link 38 is processed by the destination address controller 14 and then conveyed to the second circuit by the internal Ethernet interface 18. Data that is received over the WiFi link 38 is conveyed to the first circuit by the internal Ethernet interface 18 of the receiving communications devices for processing by its destination address controller 14. Thus, it can be appreciated that the destination address controller 14 in the first circuit controls all bridging irrespective of whether data is communicated by the wired link 36 or the WiFi link 38. The destination address controller 14 in each communications devices has the form of firmware resident in the home networking integrated circuit (i.e. the GGL541 SoC). Modification of the GGL541 SoC to implement the destination address controller 14 when reference is made to the content of the present application is within the ordinary design capabilities of the notionally skilled person when further reference is made to: product data from the vendor of a home networking chip, such as the GGL541, and the IEEE 802.1Q standard. The routing table (which constitutes a correspondence database) in each GGL541 is modified to relate each VLAN identifier to a MAC address and the interface; as mentioned above the assignment of VLAN identifiers to interfaces is described below with reference to FIG. 4.

As shown in FIG. 1, the first circuit includes an Ethernet interface that connects to an Ethernet network 22 or a device. When the Ethernet interface is connected to an Ethernet network 22, a possible scenario is the reception of a data packet bearing a VLAN identifier that is the same as a VLAN identifier used in the network 30 of FIG. 2. Therefore, the first circuit is operative to determine whether or not a VLAN identifier of a data packet received from such an external Ethernet network 22 is the same as a VLAN identifier used in the wired and wireless communications network 30. If so, the first circuit is operative to replace the VLAN identifier with a temporary, network unique VLAN identifier before the data packet is transmitted on through the network. If the data packet is due to leave the network, the first circuit of the communications device replaces the temporary, network unique VLAN identifier with the original VLAN identifier before the packet is transmitted from the network.

In the network 30 of FIG. 2, one of the first and second nodes 32, 34 is configured as a master node. The master node is operative to control the wireless propagation of broadcast and multicast data through the network. In addition, the first circuit of the other communications devices and any further communications devices in a larger network is configured such that the other communications devices are incapable of sending broadcast and multicast data. Hence, wireless packet loops are avoided. When the network is being configured or re-configured, network configuration information is received over the wired network and the modified routing table is configured in one of the nodes, e.g. the master node, before being copied to each of the other nodes in the network over the wired medium. Alternatively, a routing table can be configured or re-configured at each node based on configuration information received from the other nodes, whereby all nodes in the network have the same routing table. Hence, VLAN identification correspondence information is propagated throughout the communications network.

Figure 3:
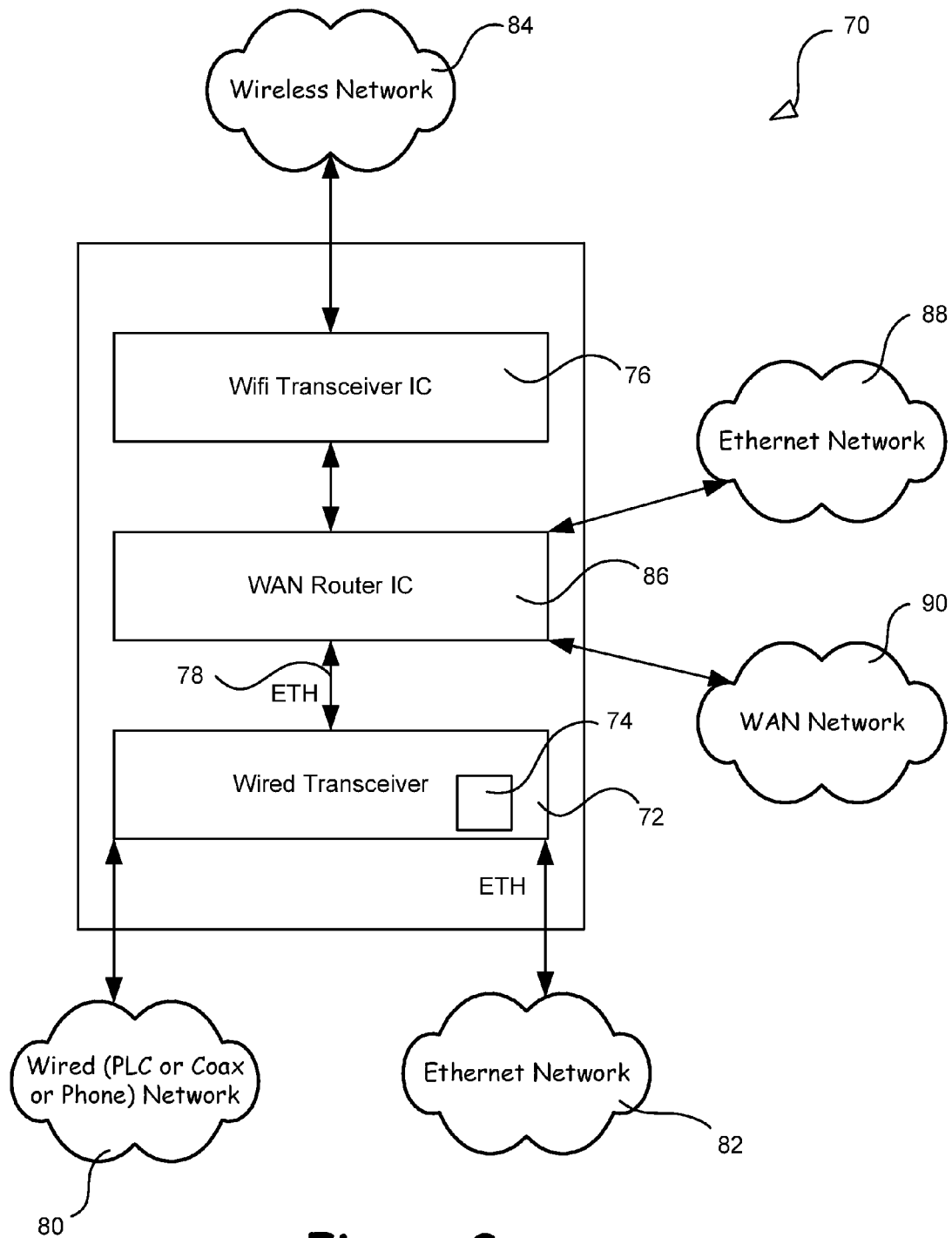
FIG. 3 is a representation of a second embodiment of the present invention.

A second embodiment 70 of communications devices according to the present invention is shown in FIG. 3. The second embodiment 70 is similar to the first embodiment in terms of it including a first circuit, which includes a wired medium interface circuit 72 and a destination address controller 74, and a second circuit, which includes a wireless medium interface circuit 76. The form and function of the destination address controller 74 is the same as for the destination address controller 14 of the first embodiment except as described below with reference to FIG. 4. In addition, the communications device 70 includes an interface 78 (which constitutes a communications link) between the first and second circuits. The interface 78 is operative according to the Ethernet 802.3 standard. As with the first embodiment, the wired medium interface circuit 72 includes a core that is based on a home networking integrated circuit (a GGL541 System on a Chip (SoC) from Gigle Networks Ltd.), which is operative to receive and transmit data over wired media 80 including powerline, coaxial cable and twisted pair. The wired medium interface circuit 72 also includes an external Ethernet interface for connection to an Ethernet network 82 or a local device as is described below with reference to FIG. 4. As with the first embodiment, the wireless medium interface circuit 76 is a known WiFi transceiver device in the form of a SoC operable according to at least one of the 802.11 standards, such as 802.11a, 802.11b, 802.11g, 802.11n, etc., and thus forms part of a WiFi network 84. The second circuit of the communications device 70 of FIG. 3 further includes a Wide Area Network (WAN) interface circuit 86 (which constitutes a WAN interface circuit). The WAN interface circuit 86 has an external Ethernet interface for communication over an Ethernet network 88 or connection to a local device (as described below with reference to FIG. 4) and an external WAN interface for communication over a WAN network 90. The WAN interface circuit 86 also has an internal Ethernet interface, which is configured to provide for communications with the first circuit, which supports the wired communications, via the interface 78. Communication between the WAN interface circuit 86 and the wireless medium interface circuit 76 is by means of a communications link, such as an Ethernet or SDIO interface where the WAN and WiFi circuits form part of the same unit but are constituted as separate chipsets. The WAN interface circuit 86 is of known form and function, such as a circuit from Cisco, Juniper, Netgear or 3com.

Figure 4:
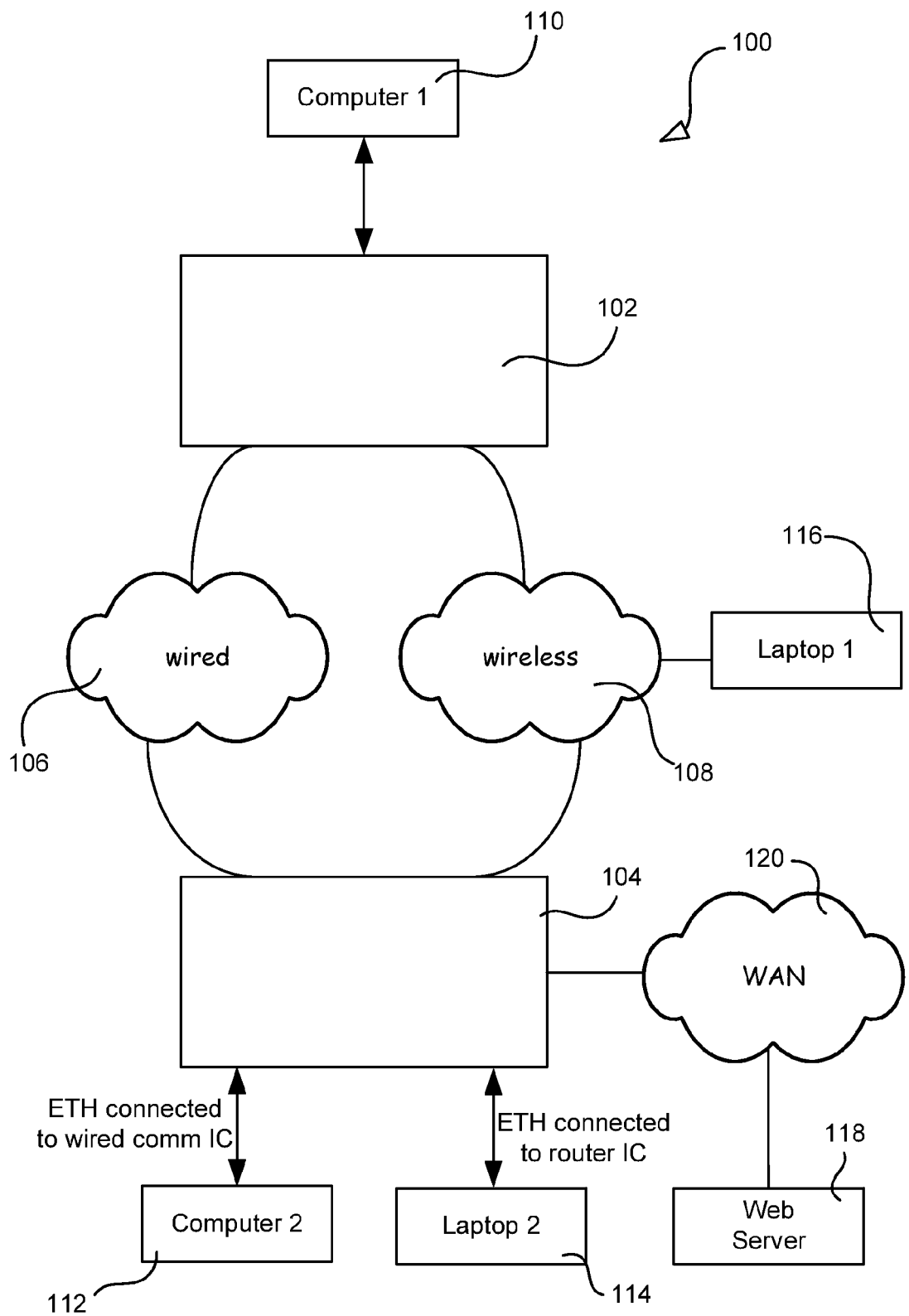
FIG. 4 is a representation of the first and second embodiments when used in a communications network.

As with the first embodiment, reference should be made to publicly available product data from the vendor of the GGL541 and from a vendor of a wireless communications circuit and of a WAN interface circuit; such product data provides sufficient information for the skilled person to implement the communications device 70 of FIG. 3 with the exception of the destination address controller 74 and the simultaneous communications by the wired and wireless medium interface circuits without resorting to any more than ordinary design skill The communications device 70 of FIG. 3 is operable to receive and transmit data to and from the wired medium interface circuit 72 and the wireless medium interface circuit 76 on a simultaneous basis, whereby a combined wireless and wired communications network may be formed from at least two such communications devices 70 or communications devices 10 according to the first embodiment as is described below with reference to FIG. 4. Provision for simultaneous wired and wireless network communications by the wired medium interface circuit 72 and the wireless medium interface circuit 76 is described below with reference to FIG. 5.

FIG. 4 shows a communications network 100 having a first 102 node and a second 104 node. The first node 102 is formed by the communications device 10 of FIG. 1 and the second node 104 is formed by the communications device 70 of FIG. 3. The communications network 100 of FIG. 4 includes further un-illustrated nodes that are connected to each other and to the nodes shown in FIG. 4 in the same fashion that the first and second nodes are connected to each other. The first and second nodes 102, 104 are connected to each other by already installed wired media 106 and by a WiFi network 108. More specifically, the already installed wired media consist of: a powerline cable; a coaxial cable; and a twisted pair telephone line. The network 100 of FIG. 4 is used to provide for communication between and amongst a plurality of rooms in a building. The first node 104 is connected to a single device, namely a first PC 110. The second node 106 is connected to two devices, namely a second PC 112 and a first laptop computer 114, with the second PC 112 being connected to the Ethernet interface of the first circuit (i.e. the GGL541) and the laptop computer being connected to the Ethernet interface of the WAN interface circuit. In addition, a second laptop computer 116 is connected to the wireless network 108 between the first and second nodes 102, 104 and a web server 118 is connected via the WAN to the WAN interface of the WAN interface circuit 86 of the second node 104.

As shown in FIG. 3, a data packet received via the wireless network 108 by the second node 104 may be intended for bridging to the second PC 112 or to the first laptop computer 114. However and as discussed above, the WiFi wireless medium interface circuit 76 at the second node is capable of supporting only one MAC address. Hence, data for the second PC 112 that is received wirelessly at the second node 104 cannot be bridged to the second PC 112 according to known approaches because the wireless medium interface circuit 76 at the second node 104 cannot distinguish between the second PC 112 and the first laptop computer 114. According to the present invention, the destination address controllers 14, 74 at each node are operative to implement a VLAN communications protocol in accordance with the IEEE 802.1Q standard as is described above with reference to the first embodiment. Therefore, a unique VLAN identifier can be attached to a data packet to provide for routing of the data packet to, for example, the second PC 112. Implementation of the VLAN communications protocol finds further application in distinguishing between and amongst interfaces of the second circuit. For example, a unique VLAN identifier is assigned to each of: the wireless interface formed by the wireless medium interface circuit 76; the WAN interface formed by the WAN interface circuit 86; and the external Ethernet interface formed by the WAN interface circuit 86. Hence, a VLAN identifier may be included in a data packet to determine whether the packet is transmitted from the second node 104 by the wireless interface, the WAN interface or the external Ethernet interface. Therefore, it can be appreciated that bridging control exerted by the first, wired communications circuit determines data flow though interfaces as well as to and from local and distant devices. Where a WAN interface includes its own bridging control the bridging control exerted by the destination address controllers 14, 74 overrides the bridging control of the WAN interface. Implementation of the VLAN communications protocol finds yet further application in distinguishing between and amongst wired medium interfaces of the first circuit. Therefore, each of the powerline cable, coaxial cable and twisted pair interfaces is assigned a unique VLAN identifier so determine the wired medium by which a particular data packet will be conveyed.

Figure 5:
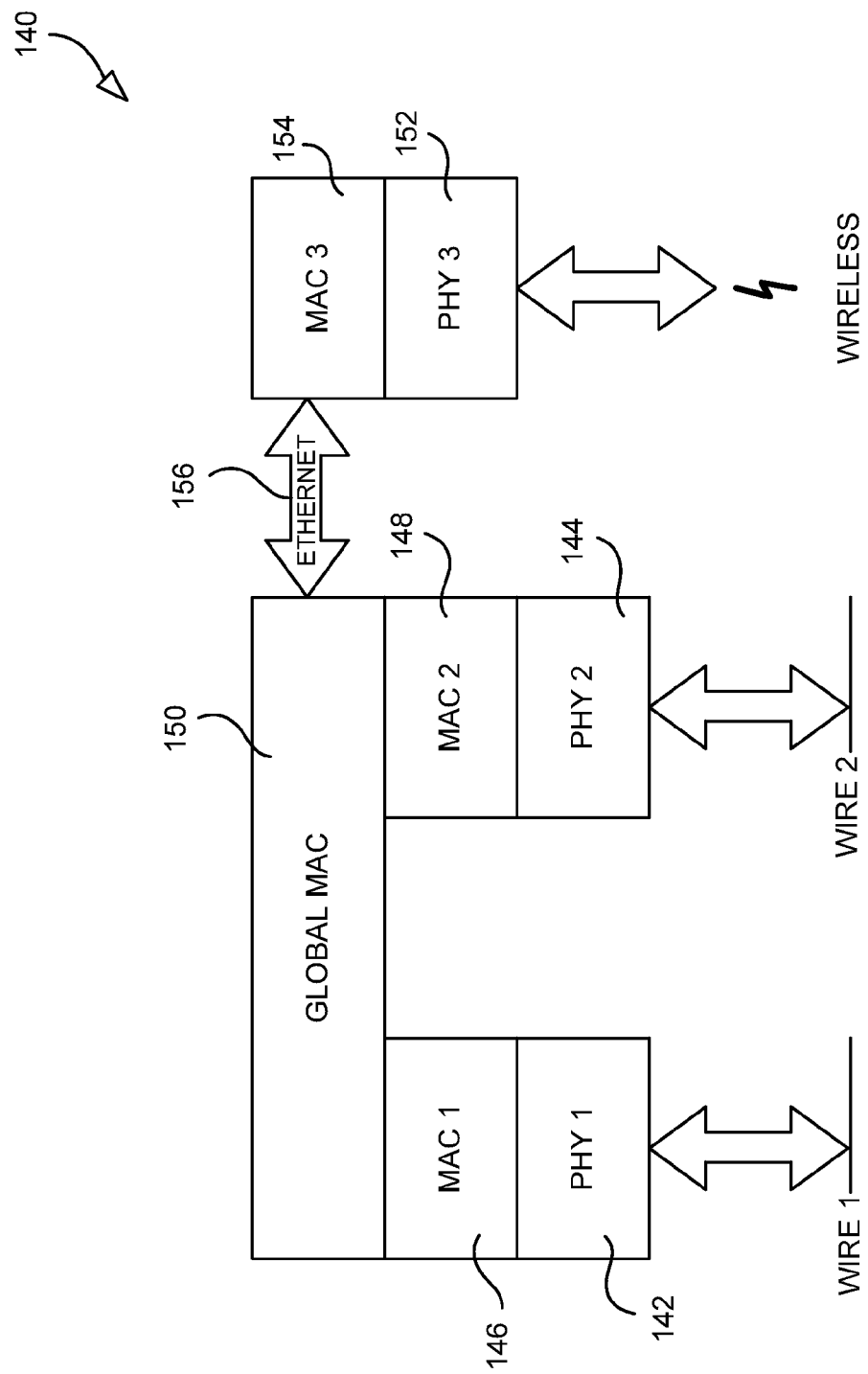
FIG. 5 is a representation of physical and medium access control layers in the communications device of FIG. 1.

FIG. 5 illustrates an embodiment of communications devices 140 that supports simultaneous communication of data over wired and wireless media. More specifically, FIG. 5 shows the physical and medium access control levels within the communications device. The communications device 140 of FIG. 5 includes a powerline medium transceiver 142 (which constitutes a first wired medium interface circuit), which is operative to interface with a powerline cable. In addition, the communications device 140 also includes a coaxial cable interface circuit 144 (which constitutes a second wired medium interface circuit), which is operative to interface with coaxial cable. The powerline medium transceiver 142 is controlled by a first Medium Access Controller (MAC) 146 and the coaxial cable interface circuit 144 is controlled by a second Medium Access Controller (MAC) 148. A system Medium Access Controller 150 (which constitutes a communications controller) controls the splitting of data amongst the powerline cable, the coaxial cable and the wireless connection, as is described below in more detail. The hitherto described components are formed as part of a first System on a Chip (SoC) based upon the GGL541 mentioned above. The hitherto described components constitute part of the first circuit described above with reference to FIGS. 1 and 2.

The communications device 140 of FIG. 5 further includes an 802.11 compliant transceiver 152 (which constitutes a wireless medium interface circuit), which is operative to interface with the WiFi network 38, 108 of FIGS. 2 and 4. The 802.11 compliant transceiver 152 is controlled by a third Medium Access Controller (MAC) 152. Communication between the system Medium Access Controller 150 and the third Medium Access Controller 154 is by way of an Ethernet connection 18, 78, 156 (which constitutes a communications link between the first and second circuits). The further described components constitute part of the second circuit described above with reference to FIGS. 1 and 2.

The operation of the communications device of FIG. 5 will now be described with reference to FIGS. 2 and 5. Movie data is to be transmitted between the first 32 and second 34 nodes. Each of the first and second Medium Access Controllers 146, 148 is operative to obtain information from its respective channel relating to quality of service measures, such as available bandwidth, latency and extent of packet loss. Also, the third Medium Access Controller 154 is operative to obtain information from the wireless network relating to quality of service measures, such as available bandwidth, latency and extent of packet loss; such information is conveyed to the system Medium Access Controller 150 by way of the Ethernet connection 156. A quality of service metric is determined as described in WO 2008/142450 (to the present applicant) or WO 2008/142449 (to the present applicant). Then the system Medium Access Controller 150 is operative to determine how data should be split amongst the powerline cable, the coaxial cable and the wireless network in dependence on the type of data being transmitted (i.e. a movie) and having regards to the quality of service information from the three media. The split data is then transmitted over the three media simultaneously. Alternatively there could be more than one flow of data (e.g. more than one movie) to be transmitted and/or received, that is, communicated between the first and second nodes 32, 34. Data can be received and/or transmitted using any combination of media in an asynchronous fashion. Thus, for example, the first and second media could be used to transmit while the third medium is used to receive or the first medium could be used to transmit and the second and third media used to receive. Alternatively, the first and third media could be used to receive while the second medium is used to transmit. Also, one of the media may not be used such that, for example, the third medium is not used while the first and second media are both used to transmit or receive or the third medium is not used while one of the first and second media is used to transmit and the other of the first and second media is used to receive. When data packets are being framed for transmission, the data packet is modified to include a VLAN identifier as described above. Also, when a data packet is received it is processed to recognize its unique VLAN identifier to thereby provide for proper bridging of the data packet.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A communications apparatus comprising:
 a first circuit comprising a wired medium interface circuit that is configured to, in use, communicate data over a wired medium;
 a second circuit comprising a wireless medium interface circuit that is configured to, in use, communicate data over a wireless medium and is operable to convey data received by the wireless medium interface circuit to the first circuit to determine a destination address for the data;
 a system medium access controller (MAC) selectively splitting the data to be communicated by the communication apparatus into a plurality of wired and wireless data parts to be simultaneously transmitted over separate medium interface circuits;
 a destination address controller comprised in the first circuit that is operative to determine to which of a plurality of destination addresses the plurality of wired and wireless data parts are to be communicated from the first or second circuit;
 a routing table modified to relate each of a plurality of unique virtual local area network (VLAN) address identifiers to a MAC address; and
 wherein the destination address controller is operable with the routing table to recognize and communicate with individual devices or interfaces at one of the plurality of destination addresses using the unique VLAN address identifiers.

2. The communications apparatus of claim 1, further comprising a communications link between the first and second circuits, the communications link operating according to a frame based standard.

3. The communications apparatus of claim 1, wherein the destination address controller comprises at least one software program.

4. The communications apparatus of claim 1, wherein the destination address controller is operative to implement a communications protocol that is operative at a data link layer.

5. The communications apparatus of claim 4, wherein the communications protocol is operative to include destination address identification information in a data packet transmitted by the communications apparatus.

6. The communications apparatus of claim 4, wherein the communications protocol is operative to recognize destination address identification information in a data packet received by the communications apparatus.

7. The communications apparatus of claim 1, wherein the destination address controller is operative to implement the VLAN with the unique VLAN address identifiers.

8. The communications apparatus of claim 4, wherein the communications protocol is in accordance with the IEEE 802.1Q standard.

9. The communications apparatus of claim 1, wherein the system medium access controller (MAC) is operative to provide for selective communication of data over each of the wired medium and the wireless medium and wherein the selective communication of data is in dependence on at least one of: network traffic load; quality of service requirements; available channel capacity; or number of hops.

10. The communications apparatus of claim 1, wherein the wired medium interface circuit and the wireless medium interface circuit operate asynchronously of each other.

11. The communications apparatus of claim 1, wherein the second circuit further comprises a Wide Area Network (WAN) interface circuit that is configured to, in use, communicate data over a WAN.

12. The communications apparatus of claim 11, further comprising a frame based standard communications link between the first circuit and the WAN interface circuit of the second circuit.

13. The communications apparatus of claim 1, wherein the second circuit further comprises a plurality of further interfaces other than an interface between the first and second circuits and each of the plurality of further interfaces correspond to a different one of a plurality of destination addresses.

14. The communications apparatus of claim 1, wherein the wireless medium interface circuit is configured for at least one of: communication in accordance with one of the IEEE 802.11 standards (i.e. WiFi); Ultra-wideband (UWB) communication; or 60 GHz communication.

15. The communications apparatus of claim 1, wherein a destination address corresponds to at least one of: a device connected to one of the communications apparatus itself or another communications apparatus; or an interface circuit forming part of the communications apparatus itself or another communications apparatus.

16. The communications apparatus claim 1, further comprising a correspondence database within the routing table, the correspondence database relating each destination address to a different one of a device and an interface circuit.

17. A communications apparatus comprising:
 a first circuit comprising a wired medium interface circuit that is configured to, in use, communicate data over a wired medium;
 a second circuit comprising a wireless medium interface circuit that is configured to, in use, communicate data over a wireless medium and is operable to convey data received by the wireless medium interface circuit to the first circuit to determine a destination address for the data;
 a third circuit comprising a wide area network interface circuit that is configured to, in use, communicate data over a wireless medium;
 a system medium access controller (MAC) selectively splitting the data to be communicated by the communication apparatus into a plurality of wired and wireless data parts to be simultaneously transmitted over separate interface circuits, including any of the first, second or third circuits;
 a destination address controller comprised in the first circuit that is operative to determine to which of a plurality of destination addresses at a communications apparatus the plurality of wired and wireless data parts are to be communicated from one or more of the first, second and third circuits; and wherein the destination address controller is operable to implement a communications protocol that is operative to recognize unique virtual local area network (VLAN) address identifiers corresponding to the plurality of destination addresses where the destination addresses identify at least specific ones of the interface circuits or devices attached to the communications apparatus.

18. A communications apparatus comprising:

a first circuit of a first system on a chip (SoC) comprising a wired medium interface circuit that is configured to, in use, communicate data over a wired medium;

a second circuit of a second system on a chip (SoC) comprising a wireless medium interface circuit that is configured to, in use, communicate data over a wireless medium and is operable to convey data received by the wireless medium interface circuit to the first circuit to determine a destination address for the data;

a third circuit of a third system on a chip (SoC) comprising a wide area network interface circuit that is configured to, in use, communicate data over a wireless medium;

a system medium access controller (MAC) of the first system on a chip (SoC) selectively splitting the data to be communicated by the communication apparatus into a plurality of wired and wireless data parts to be simultaneously transmitted over separate interface circuits;

a destination address controller comprised in the first circuit that is operative to determine to which of a plurality of destination addresses at a communications apparatus the plurality of wired and wireless data parts are to be communicated from one or more of the first, second and third circuits; and wherein the destination address controller is operable to implement a communications protocol that is operative to recognize unique virtual local area network (VLAN) address identifiers corresponding to the plurality of destination addresses where the destination addresses identify at least specific ones of the plurality of interfaces circuits or devices attached to the communications apparatus.

19. The communications apparatus of claim 17, further comprising a communications link between the first and second circuits, the communications link operating according to a frame based standard.

20. The communications apparatus of claim 18, further comprising a communications link between the first and second circuits, the communications link operating according to a frame based standard.

\* \* \* \* \*